DISTRIBUTED AMPLIFIER

Filed Jan. 5, 1962 6 Sheets-Sheet 1

INVENTOR.
ALFRED B. BECK
BY Benjamin De Witt
ATTORNEY

Nov. 16, 1965 A. B. BECK 3,218,569

DISTRIBUTED AMPLIFIER

Filed Jan. 5, 1962 6 Sheets-Sheet 2

INVENTOR.
ALFRED B. BECK
BY
Benjamin [signature]
ATTORNEY

Nov. 16, 1965 A. B. BECK 3,218,569

DISTRIBUTED AMPLIFIER

Filed Jan. 5, 1962 6 Sheets-Sheet 3

ALFRED B. BECK
INVENTOR.

BY Benjamin DeWitt

ATTORNEY

Nov. 16, 1965 A. B. BECK 3,218,569

DISTRIBUTED AMPLIFIER

Filed Jan. 5, 1962 6 Sheets-Sheet 4

INVENTOR.
ALFRED B. BECK
BY
Benjamin DeWitt
ATTORNEY

Nov. 16, 1965 A. B. BECK 3,218,569

DISTRIBUTED AMPLIFIER

Filed Jan. 5, 1962 6 Sheets-Sheet 5

ALFRED B. BECK
INVENTOR.

BY Benjamin De Witt
ATTORNEY

Nov. 16, 1965 A. B. BECK 3,218,569

DISTRIBUTED AMPLIFIER

Filed Jan. 5, 1962 6 Sheets-Sheet 6

ALFRED B. BECK
INVENTOR.

BY Benjamin De Witt
ATTORNEY

United States Patent Office 3,218,569
Patented Nov. 16, 1965

3,218,569
DISTRIBUTED AMPLIFIER

Alfred B. Beck, Northridge, Calif., assignor, by mesne assignments, to TRW Inc., a corporation of Ohio Filed Jan. 5, 1962, Ser. No. 165,719
9 Claims. (Cl. 330—54)

The present invention relates to distributed amplifiers, and more particularly to improvements in high power distributed amplifiers which are particularly advantageous for amplifying a wide band of frequencies in the VHF and UHF frequency regions.

The invention is particularly applicable to power amplification for radio signal transmitters and will be described with regard thereto, although it is to be understood that the invention is not limited in this respect but may be used wherever there is a need for power amplification of high frequencies with reasonably constant power gain throughout a bandwidth of at least a few tens of megacycles.

In the prior art the lack of sufficient bandwidth in high frequency amplifier circuits has notoriously been a result of the inter-electrode capacitance of electron tubes and the distributed capacitances and inductances of conventional circuits. For example, one known form of high power radio frequency amplifier comprises a pair of vacuum tubes connected in push-pull and having a resonant output circuit, with the output circuit comprising inductances tuned to anti-resonance by the stray and inter-electrode capacitance of the vacuum tubes. These stray and inherent reactances are sufficient to severely limit the maximum operative frequency and bandwidth of conventional amplifier circuits.

In recent years there has evolved a unique type of amplifier apparatus in which, by appropriate distribution of ordinary electron tubes or other amplifier devices along artificial transmission lines, it is possible to obtain amplification over much greater bandwidths than was possible with conventional circuits. The classical concept of maximum bandwidth-gain product is not applicable to these artificial transmission line amplifier arrangements which have come to be known as "distributed amplifiers."

A basic study of distributed amplifiers has been presented in Proceedings of the IRE, volume 36, No. 8 (August 1948), in an article appearing at pages 956–969, entitled "Distributed Amplification," by E. L. Ginzton et al. That article is here recognized as the prior art foundation on which the improvements of the present invention are based.

In the development and construction of amplifiers of the general class above described, the present applicant has recognized a number of shortcomings which are inherent in the basic distributed amplifier concept. Among other things, it has been found that the basic distributed amplifier is not particularly useful for extremely high power systems because the output transmission line is classically terminated at one end in a reverse terminating network which is ordinarily required to dissipate about the same amount of power as that which can be usefully derived and applied to a load from the other end of the output line. Further, it has been discovered that when more than about six or eight electron tubes are distributed along and coupled between a single pair of conventional transmission lines, further addition of more amplifiers does not actually increase the useful power output to the extent which would be expected from the teachings of the prior art.

Accordingly, it is an object of the present invention to provide a distributed amplifier in which the useful power gain is relatively constant over the desired frequency bandwidth as compared with the power gain versus frequency characteristic of prior art distributed amplifiers.

It is another object of the present invention to provide a distributed amplifier in which the power inherently delivered to the reverse termination network is minimized, thereby enabling reduction of the wattage rating and the heat dissipation and physical size of the reverse termination impedance.

It is a further object of the present invention to provide an amplifier of the type described in which the signal voltages applied to the control electrodes of the various distributed amplifier devices are controllably maintained within predetermined limits so as to improve vacuum tube life and system reliability.

It is an additional object of the present invention to provide a distributed amplifier which may be packaged within a reasonably small volume such that the adjacent tubes exhibit appreciable anode-to-anode capacity and in which the circuit arrangements utilized take that inter-tube capacity into account and compensate for the same.

It is a more specific object of the invention to provide an amplifier of the above-described type in which the input transmission line passband characteristic is staggered relative to that of the output transmission line to eliminate or at least reduce edge of band peaks in the power gain characteristic.

It is a similar object of the present invention to provide an input transmission line passband covering a wider frequency range than the desired composite passband of the amplifier to produce improved stability and avoid the possibility of undesired oscillations at certain critical frequencies.

It is a general object of the present invention to provide a distributed amplifier circuit capable of producing increased power output at ultra-high frequencies and over a bandwidth exceeding 100 megacycles and featuring improved efficiency and circuit structure economy.

In accordance with a preferred embodiment of the present invention, there are provided first and second signal transmission lines and a plurality of high power vacuum tube amplifier devices which individually have their input electrodes connected to spaced points on the first transmission line and their output electrodes connected to spaced points along the second transmision line. The transmission lines are constructed and arranged to have incremental signal phase shift characteristics which are each functions of the input signal frequency, but with the phase shift characteristic of the first line being purposely different from that of the second line. More particularly, in one specific embodiment, the first or input transmission line is constructed to have a phase shift characteristic which is larger than the same characteristic of the output transmission line at signal frequencies of the order of 100 megacycles and which is appreciably smaller than the phase shift characteristic of the output line at frequencies of the order of 200 megacycles.

The foregoing and other objects and features of the present invention will be apparent from the following description taken with the accompanying drawings, throughout which like reference characters indicate like parts, which drawings form a part of this application and in which.

Figure 12:
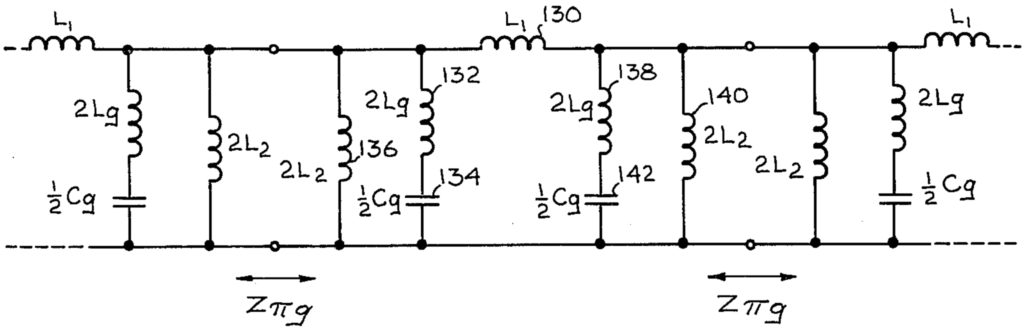
Figure 13:
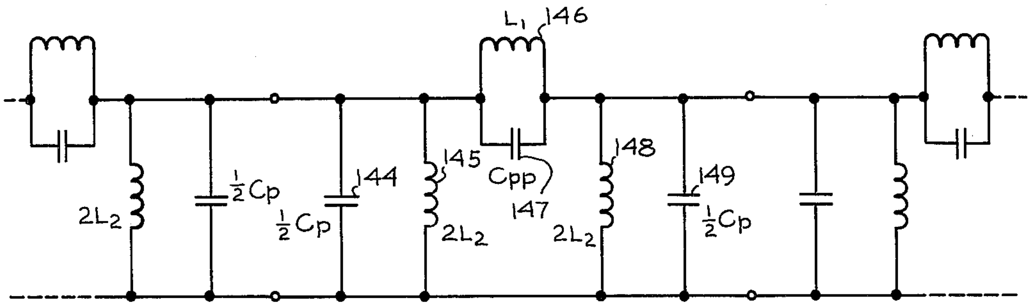

FIGS. 6 to 11, inclusive, are a plurality of graphs illustrating characteristics of various distributed amplifier configurations; and FIGS. 12 and 13 are fragmentary circuit diagrams illustrating wave transmission lines in accordance with a further embodiment of the invention.

Figure 1:
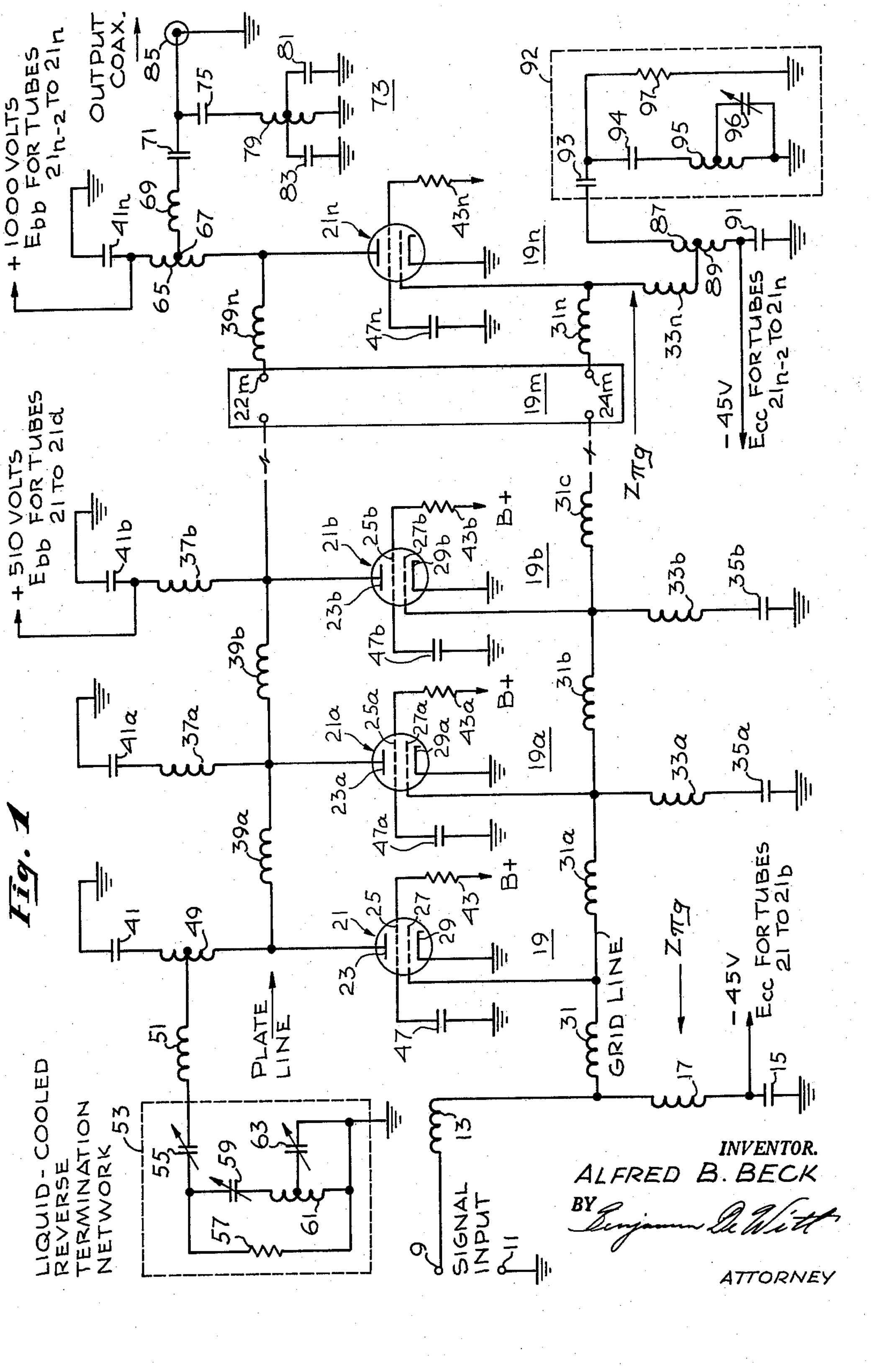
FIGURE 1 is a schematic diagram of an amplifier constructed in accordance with the present invention.

Referring to FIG. 1 of the drawings, there is shown a complete circuit diagram of one amplifier apparatus which has been constructed in accordance with the principles of the present invention. The diagram of FIG. 1 includes certain non-essential details and circuit features of a minor nature. Because of the complexity of the present invention, the completeness of the circuit shown in FIG. 1 is thought to be desirable in that it gives a concrete embodiment from which analysis may proceed. The particular embodiment shown for purposes of illustration includes a first transmission line comprising series inductors 31, 31*a*, 31*b* . . . 31*n* and shunt inductors 33*a*, 33*b*, etc. The input end of the first transmission line is connected to a source of input signal comprising terminals 9 and 11 by means of an impedance matching network which includes series inductor 13 and shunt inductor 17, with inductor 17 connected at its lower end to a point of reference potential or ground by means of a D.C. blocking by-pass capacitor 15. The junction point between inductor 31 and inductor 31*a* is connected to the grid or input electrode 27 of a first vacuum tube 21. Similarly, the junction point between inductors 31*a* and 31*b* is connected to the control electrode 27*a* of a second vacuum tube 21*a*, and the junction point between inductors 31*b* and 31*c* is connected to the control electrode 27*b* of a third tube 21*b*.

In the preferred embodiment, the vacuum tubes 21, 21*a*, 21*b* . . . are high power amplifier devices of the pentode type having fluid-cooled anodes or output electrodes 23, 23*a*, 23*b*, etc. The screen grid 25 of the tube 21, for example, is by-passed to ground by a D.C. blocking capacitor 47 and is connected through a series current limiting resistor 43 to a positive potential source B+. The screen grid circuits of the successive tubes 21*a*, 21*b*, etc., are similarly arranged. The anodes or output electrodes 23, 23*a*, 23*b*, etc., are respectively connected to spaced points along a second transmission line, which line comprises series inductors 39*a*, 39*b*, etc., and shunt inductors 37*a*, 37*b*, etc. The first shunt inductor 49 of the output transmission line is connected at its lower end to anode 23 and is by-passed at its upper end to ground by means of a D.C. blocking capacitor 41. The other shunt inductors 37*a*, 37*b*, etc., are similarly connected to ground at their upper ends by D.C. blocking capacitors 41*a*, 41*b*, etc.

The first shunt inductor 49 has an intermediate terminal or mid-tap connected through a series inductor 51 to a reverse termination network 53 which is, in a preferred embodiment, a fluid cooled structure enabling the dissipation of reverse power of the order of several hundred watts. Network 53 comprises a series capacitor 55 having its left-hand end connected to the upper end of a resistor 57 which is grounded or connected to the common point of reference potential at its lower end. Resistor 57 is shunted by an impedance matching network comprising the series combination of a capacitor 59 and an inductor 61. The inductor 61 has an intermediate terminal or mid-tap connected to ground by a tunable capacitor 63.

As shown in FIG. 1, only three tubes 21, 21*a*, and 21*b*, and hence only three successive sections of the two separate transmission lines, have been detailed. It is to be understood, of course, that the amplifier is iterative, that is, it may comprise successive sections 19*c*, 19*d*, . . . 19*n*. In a preferred embodiment which has actually been constructed, fourteen tubes and hence thirteen iterative sections in each transmission line have been used. The next to the last section 19*m* shown in block diagram form has its output transmission line terminal 22*m* connected through a series inductor 39*m* to anode of tube 21*n* and has its input transmission line terminal 24*m* connected through a series inductor 31*n* to the grid of the tube 21*n*. The section 19*n* comprising tube 21*n* and its associated circuits is generally similar to the aforedescribed sections 19, 19*a*, 19*b*, etc. The only differences worthy of note are that the anode of tube 21*n* is connected to a shunt inductor 65 having an intermediate terminal or mid-tap 67, with the mid-tap 67 connected through a series inductor 69 and a series capacitor 71 to a termination network 73. The termination network 73 comprises the series combination of a capacitor 75 and an inductor 79 which has its lower end connected to ground. Inductor 79 is provided with an intermediate terminal or mid-tap to which is connected a capacitor 81 which shunts the lower portion of inductor 79. The junction point between capacitor 71 and capacitor 75 is connected to an output terminal 85 which preferably comprises a coaxial connector for delivery of output power to a coaxial line having an impedance matched to the impedance looking into the output end of the impedance matching network 73. The intermediately tapped shunt inductor 65, together with series inductor 69 and series capacitor 71 and the network 73, provides impedance transformation so that the output transmission line is properly matched to the output coaxial cable (not shown) to thereby avoid reflections and standing waves along the output transmission line.

The right-hand end of the input transmission line is terminated in a termination network 92 comprising resistor 97 shunted by the series combination of inductors 94 and 95, with inductor 95 shunted by a tunable capacitor 96. The termination network 92 is connected to the right-hand end of the input transmission line by an impedance transformation arrangement comprising intermediately tapped inductor 87 which has its lower end connected to ground by a by-pass capacitor 91 and has its intermediate tap connected by way of inductor 33*n* to a grid of tube 21*n*. Thus inductor 33*n* and inductor 87 couple the right-hand end of the input transmission line to the termination network 92 and provide impedance matching between the transmission line and the termination network. Finally, it is important to observe, with reference to FIG. 1, that the first tubes 21, 21*a*, and 21*b* are energized from a source of +510 volts, which is connected to their anodes through inductor 37*b*. In accordance with the preferred embodiment of the invention, the first three or four tubes have 510 volts applied to their anodes, the next four tubes 21*e*, 21*f*, 21*g*, and 21*h* (not shown) have about 700 volts applied to their anodes, and so forth, with the last three tubes having about 1000 volts as their anode energizing potential. The foregoing arrangement wherein the anode source potential is increased along the successive tubes of the distributed amplifier has certain power conservation advantages which will be described in more detail hereinafter.

Very generally, the operation of the amplifier illustrated in FIG. 1 is as follows: An alternating current input signal applied to the terminals 9 and 11 causes an alternating voltage wave to propagate along the input transmission line. As this voltage wave arrives at the grids of the distributed tubes, the tubes successively respond to the input voltage wave by causing currents to flow in their individual plate circuits at successive times, with the time interval between reactions of successive tubes being dependent upon the time delay or phase shift characteristic of the transmission line section between a successive pair of grids. The plate current generated by each tube causes a voltage wave to travel along the output transmission line in both directions. For example, the plate current of tube 21*a* propagates a signal forwardly along the output line toward the final line section 19*n* and also propagates a reverse wave toward the reverse termination network 53. If the reverse termination network 53 is ideal, the waves which travel in the reverse direction along the output transmission line will be completely absorbed and dissipated by the termination network 53. If the incremental phase constant or phase shift characteristic of each input transmission line section is equal or nearly equal to the phase constant of each section of the output transmission line, the waves which travel to the right in the output transmission line will add together in exact synchronism. That is, supposing that a voltage spike or pulse were applied to the input transmission line at its input terminals 9 and 11, each tube would have a pulse applied to its grid, but with the first tube 21 receiving the pulse at its grid at a first time and with the successive tubes having their grids pulsed at successively later times. The plate current pulse from tube 21 would occur earliest in time. Because of the time delay or phase shift provided by the plate transmission line section between tubes 21 and 21*a*, the plate current pulse from tube 21 would arrive at tube 21*a* at exactly the same time that a plate current pulse occurs in tube 21*a*. Thus, the two plate current pulses are superimposed to form a single pulse of increased amplitude. As that pulse propagates along the output signal transmission line, each successive tube will add an in-phase pulse of plate current so that the amplifier produces, at the output end of the output transmission line, a very substantially enhanced signal. It may be observed that, for a given input signal amplitude, the output voltage and output power theoretically are directly proportional to the number of tubes. The result is, at least in theory, that the composite $g_m$, or amplification factor of the distributed amplifier, can be increased by adding successive tubes and transmission line sections.

The foregoing has been a relatively superficial explanation of the operation of distributed amplifiers utilizing the basic concepts. Full appreciation of the advantages of the present invention requires a more rigorous analysis of the operation, and consideration of the circuit parameters and relationships which constitute the primary features of the invention.

Figure 2:
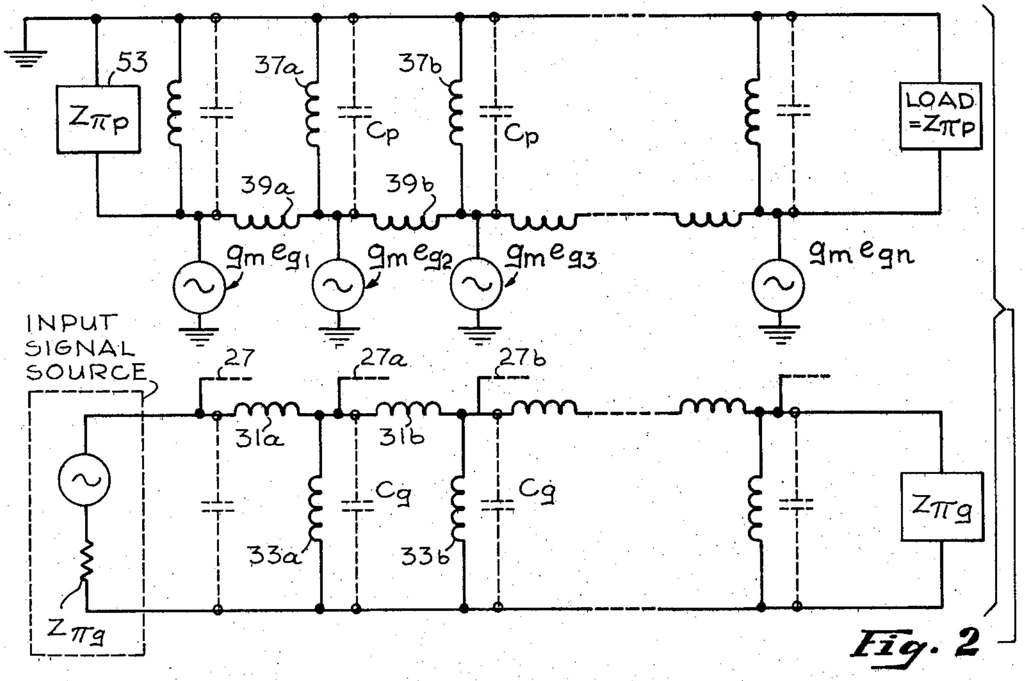
FIG. 2 is a simplified equivalent schematic diagram more clearly illustrating the wave transmission lines which are embodied in the circuit shown in FIG. 1.

In FIG. 2 there is shown a simplified equivalent diagram more clearly indicating that the system of FIG. 1 constitutes a pair of wave transmission lines which are joined together at spaced points by the amplifier devices 21, 21*a*, 21*b*, etc. Referring to FIG. 2, and particularly to the output transmission line comprising indicators 37*a*, 37*b*, 39*a*, and 39*b*, etc., a plurality of current sources $g_m e_{g1}$, $g_m e_{g2}$ . . . $g_m e_{gn}$, which individually represent the plate circuits of distributed amplifier devices 21, 21*a*, etc., are all supplying current contributions to the output transmission line and therefore are all contributing to the current flowing to the load $Z_{\pi p}$ (and also to the reverse termination 53). It may be observed that a current pulse from $g_m e_{g1}$ is phase shifted or delayed during its travel from the source $g_m e_{g1}$ to the load, with the delay or phase shift being an amount $(n-1)\theta$, where $n$ is the number of filter sections between the first tube and the load and where $\theta$ is the phase shift or time delay of a single output transmission line section. Accordingly, to make the current pulses from all the tubes be in phase at the load, it is necessary that the first tube be "triggered" first, with successive tubes along the plate line being triggered at intervals corresponding to the plate line network phase constant $\theta$. With that provision, the pulses generated at the different times ideally will arrive at the load simultaneously or without time dispersion, thereby providing a pulse of maximum power at the load in response to a given pulse amplitude input to the grids. To ideally produce the foregoing effect, the grids should be successively pulsed at intervals accurately corresponding to the output transmission line phase constant $\theta$. Feeding the grids from successive spaced points along the input transmission line can provide that desired function. That is, if the input or grid transmission line phase constant is identical to that of the plate transmission line at all frequencies, the currents provided by the various amplifier devices and traveling toward the output load will always add in phase at the load, while the individual current components which are propagated toward the reverse termination 53 will tend to cancel one another or be substantially dispersed in time. The result is that the voltage appearing at the reverse termination 53 will equal the output load voltage only at certain specific signal frequencies where the incremental phase shift per line section is either 0 or 180 electrical degrees. In other words, for an amplifier with a large number of tubes distributed along the lines, the reverse termination voltage will be very low in comparison with the load voltage over most of the frequency band. The foregoing illustrative explanation of the distributed amplifier concept used a single pulse for clarity and simplicity. In actual practice, the amplifier input will always be at least a sine wave and more often will be a wideband signal including Fourier components at frequencies ranging over many tens of megacycles. For example, in one embodiment the present invention is desired to handle signals occupying a signal band from 100 to 210 megacycles. If it were only necessary to deal with a single frequency or monochromatic signal, synchronization of the plate transmission line with the grid transmission line would be no great problem. However, when a broad frequency range of possible signals must be handled, it becomes necessary to rigorously consider how $\theta$, the plate transmission line phase constant, and $\phi$, the grid transmission line phase constant, vary as functions of frequency. At first glance it may seem that making $\theta$ identical to $\phi$ across the frequency band would give the ideal result. Such is not the case. It will be seen from considerations hereafter presented that a controlled, sagaciously chosen difference between the phase shift characteristic $\theta$ and $\phi$ is desirable and produces highly advantageous results.

Figure 3:
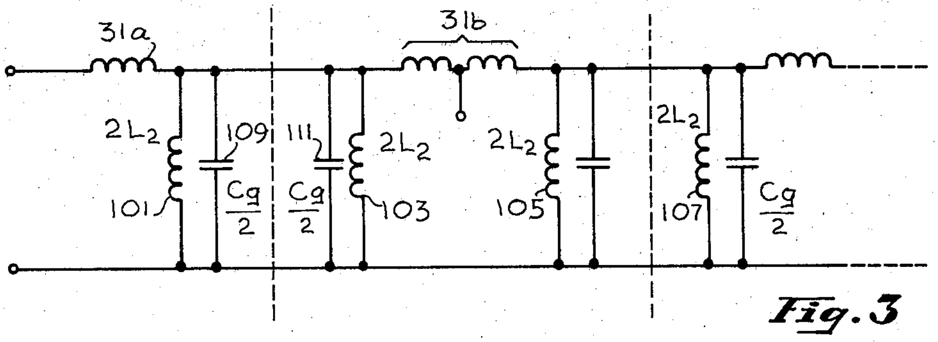
FIG. 3 is a fragmentary schematic diagram of a portion of one of the transmission lines shown in FIG. 2.

To provide a rigorous foundation for the analysis which immediately follows, there is shown in FIG. 3 an equivalent three-element mid-shunt $\pi$ section corresponding to an iterative portion of the grid transmission line of FIGS. 2 and 1. More exactly, in FIG. 3 the portion between the dotted lines is a $\pi$ network functionally and electrically equivalent to the entire circuit between two successive grids 27*a* and 27*b* of FIG. 2. As shown in FIG. 3, the inductor 31*b* is diagrammatically divided into two equal series-connected portions each having an inductance equal to one-half the inductance of element 31*b*. Inductors 101 and 103 each have an inductance equal to twice the inductance of element 33*a* so that the two connected in parallel are electrically equivalent to 33*a*. The same is true of the parallel-connected inductors 105 and 107. Capacitors 109 and 111 connected in parallel are electrically equivalent to the inherent tube capacitance $C_g$, as shown in FIG. 2. The equivalent circuit between the dotted lines in FIG. 3 is a network which can be dealt with by means of classical network design formulas and techniques, as set forth by the International Telephone and Telegraph Corporation handbook "Reference Data for Radio Engineers," 4th edition (1956), at pages 164 to 186.

Specifically, the network between the dotted lines in FIG. 3 is of the same form as the full $\pi$ section shown in the above handbook at page 164, FIG. 1(*c*). In the specific embodiment of my invention now under consideration, the iterative network between each pair of grids corresponds to the three-element shunt I section illustrated by the second figure on page 172 of the above "Reference Data . . ." handbook.

Figure 4:
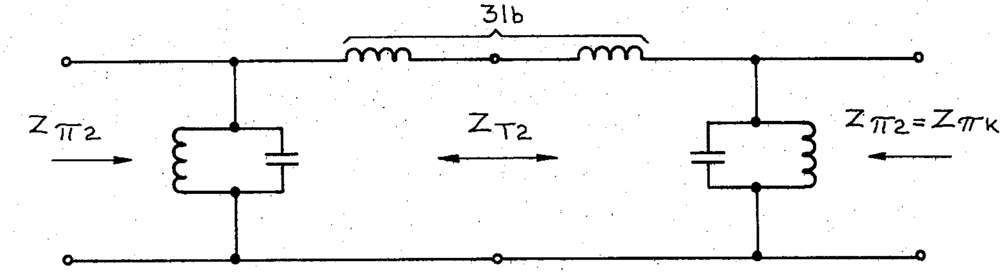
FIG. 4 is a fragmentary circuit diagram useful in analyzing the circuits of the invention.
Figure 5:
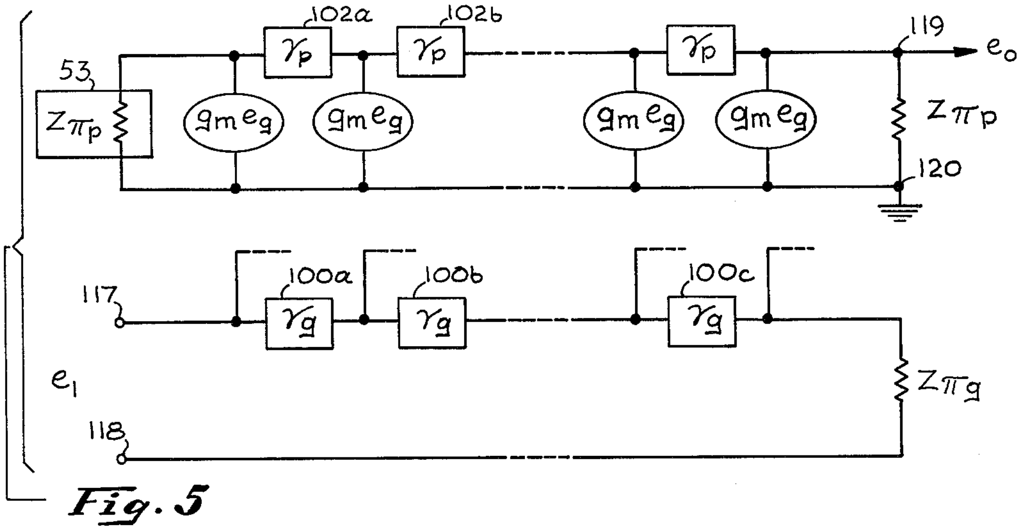
FIG. 5 is a block diagram useful for mathematical analysis of the invention.

Accordingly, the grid transmission line circuit of the present invention comprises a series of iterative sections which are reducible, for analysis, to the equivalent form shown in FIG. 4. As such, the iterative networks 100*a*, 100*b* . . . and 102*a*, 102*b* . . ., as shown in block diagram form in FIG. 5, are responsive to the classical network formula of the "Reference Data . . ." handbook above mentioned. The following analysis, therefore, so far as possible, uses conventional notation of the classical image parameter design techniques. Where necessary, additional notation is used in accordance with the following definitions:

*Definitions*

(1) $\omega_{1d}$, $\omega_{2d}$=lower and upper frequency limits, respectively, of the desired composite passband of the amplifier.

(2) $\omega_{0d}=\sqrt{\omega_{1d}\omega_{2d}}$=desired center of passband frequency.

(3) $\omega_{1g}$, $\omega_{2g}$=lower and upper frequency limits, respectively of the grid line passband.

(4) $\Delta\omega_g=\omega_{2g}-\omega_{1g}$=grid line bandwidth.

(5) $\omega_{0g}=\sqrt{\omega_{1g}\omega_{2g}}$ (6) $\omega_{1p}$, $\omega_{2p}$=lower and upper frequency limits, respectively of the plate line passband.

(7) $\Delta\omega_p=\omega_{2p}-\omega_{1p}$ (8) $\omega_{0p}=\sqrt{\omega_{1p}\omega_{2p}}$ From page 172 of the "Reference Data . . ." handbook, it is seen that $Z_{\pi 2}$ of the three-element shunt I section is equal to $Z_{\pi k}$, the mid-shunt impedance of a constant-*k* section. Therefore, from the last formula on page 170 of the "Reference Data . . ." handbook we know that the grid transmission line mid-shunt impedance $Z_{\pi g}$ is:

(9) $$Z_{\pi g}=\frac{R_g\omega\Delta\omega_g}{\sqrt{(\omega_{2g}^2-\omega^2)(\omega^2-\omega_{1g}^2)}}=$$

grid line mid-shunt impedance level for either constant-*k* or three-element shunt I full sections.

(10) $R_g=Z_{\pi g}(\omega_{0g})$=grid line mid-shunt impedance level at $\omega_{0g}$; i.e., the impedance presented by the three-element shunt I section to signals of frequency $\omega_{0g}$.

(11) $$Z_{\pi p}=\frac{R_p\omega\Delta\omega_p}{\sqrt{(\omega_{2p}^2-\omega^2)(\omega^2-\omega_{1p}^2)}}=$$

plate line mid-shunt impedance level for either constant-*k* or three-element shunt I full sections.

(12) $R_p=U_{\pi p}(\omega_{0p})$=plate line impedance level at $\omega_{0p}$.

(13) $G_{pn}$=normalized power gain, i.e., the power gain at any given frequency $\omega$ ratioed to the power gain at the mid-band frequency $\omega_{0d}$.

(14) $C_g$=grid input capacitance of a single amplifier device.

(15) $C_p$=plate output capacitance, i.e., the sum of interelectrode and stray capacitance of a single tube anode.

(16) $g_m$=tube transconductance.

(17) $$A=\frac{g_m}{2}Z_{\pi p}$$

(18) Unless otherwise noted, all voltages and currents will understood to be R.M.S. quantities.

The complex voltage gain from the grid transmission line input port (terminals 117, 118 in FIG. 5) to the plate transmission line output port (terminals 119, 120) is given by the following: (Conventional phasor notation is employed; i.e., $e_0/e_1$ equals the real part of the right-hand half of the following equations.)

$$\frac{e_0}{e_1}=A\epsilon^{-(n-1)\gamma_p}+A\epsilon^{-(n-2)\gamma_p-\gamma_g}+\ldots+A\epsilon^{-(n-1)\gamma_g} \tag{1}$$

$$\frac{e_0}{e_1}=A\epsilon\sum_{k=1}^{n}\epsilon^{-(n-k)\gamma_p-(k-1)\gamma_g} \tag{2}$$

$$\frac{e_0}{e_1}=A\epsilon^{\gamma_g-n\gamma_p}\sum_{k=1}^{n}\epsilon^{-k(\gamma_g-\gamma_p)} \tag{3}$$

$$\frac{e_0}{e_1}=A\epsilon^{-(n-1)\gamma_p}\frac{1-\epsilon^{-n(\gamma_g-\gamma_p)}}{1-\epsilon^{-(\gamma_g-\gamma_p)}} \tag{4}$$

$$\frac{e_0}{e_1}=A\epsilon^{-(n-1)\left[\gamma_p+\left(\frac{\gamma_g-\gamma_p}{2}\right)\right]}\left[\frac{\sinh n\left(\frac{\gamma_g-\gamma_p}{2}\right)}{\sinh\left(\frac{\gamma_g-\gamma_p}{2}\right)}\right] \tag{5}$$

Assuming, for the moment, that the transmission lines of the present invention are substantially lossless, Equation 5 may be greatly simplified by observing that $\alpha_g=0$, and $\alpha_p=0$, and therefore $\gamma_g=j\phi$, and $\gamma_p=j\theta$ within the grid line and plate line passbands, respectively. Accordingly with $\alpha_g=0$, the complex voltage becomes:

$$\frac{e_0}{e_1}=A\epsilon^{-j(n-1)\left(\theta+\frac{\phi-\theta}{2}\right)}\left[\frac{\sin n\frac{(\phi-\theta)}{2}}{\sin\frac{(\phi-\theta)}{2}}\right] \tag{5a}$$

Equation 5*a* can be further simplified by defining the differential phase characteristic or differential phase shift constant as $\psi=\phi-\theta$. With that definition, Equation 5*a* may be rewritten as follows:

$$\frac{e_0}{e_1}=A\epsilon^{-j(n-1)[\theta+\psi/2]}\left[\frac{\sin n\psi/2}{\sin\psi/2}\right] \tag{6}$$

wherein $\psi$ is the differential phase shift characteristic, or the difference between the phase shift constant of a given grid line full $\pi$ section and the phase shift constant of the corresponding plate line section.

The absolute value of the voltage gain is then given by the following expression:

$$G_v=\frac{e_0}{e_1}=|A|\left|\frac{\sin n\psi/2}{\sin\psi/2}\right| \tag{7}$$

The grid line input power is:

$$P_1=\frac{e_1^2}{Z_{\pi g}} \tag{8}$$

The plate line output power is:

$$P_0=\frac{e_0^2}{Z_{\pi p}} \tag{9}$$

Accordingly, by combining Equations 7, 8, and 9, the power gain of the distributed amplifier as shown in FIG. 5 may be expressed as:

$$G_p=\frac{P_0}{P_1}=\frac{Z_{\pi g}}{Z_{\pi p}}(A)^2\left[\frac{\sin n\psi/2}{\sin\omega/2}\right]^2$$

Substituting the defined value of A from definition 17 in the above gives:

$$G_p=\frac{P_0}{P_1}=\left(\frac{g_m}{2}\right)^2Z_{\pi g}Z_{\pi p}\left[\frac{\sin n\psi/2}{\sin\psi/2}\right]^2 \tag{10}$$

To appreciate the significance and usefulness of Equation 10 above, it is necessary to perform some preliminary derivations and to then examine individually the factors included in Equation 10. It is known from the aforementioned "Reference Data . . . " handbook that the mid-shunt image impedance $Z_\pi$ of a three-element shunt I section is equal to the mid-shunt image impedance $Z_{\pi k}$ of the classical constant-*k* filter section. The mid-shunt image impedance $Z_\pi$ normalized to its value at $\omega_0$ is given by the following expression:

$$\frac{Z_\pi}{R}=\frac{\omega(\omega_2-\omega_1)}{\sqrt{(\omega_2^2-\omega^2)(\omega^2-\omega_1^2)}} \tag{11}$$

Figure 7:
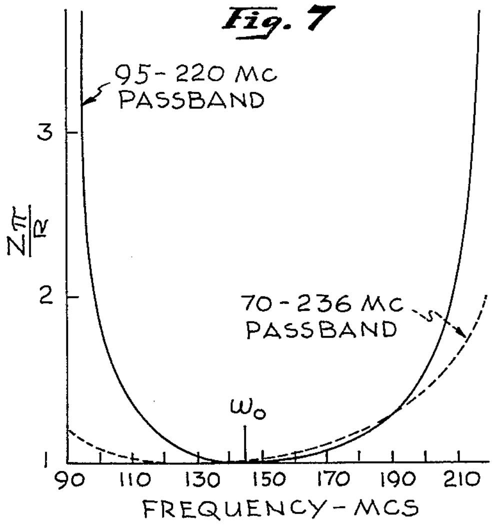

Equation 11 has been graphed in FIG. 7 for a passband extending from 95 to 220 megacycles ($f_o$=144.5 mc.), and for a second passband extending from 70 to 236 megacycles ($f_o$=128.5 mc.). It is important to note that in both cases the graphs indicate that the normalized image impedance $Z_\pi/R$ is extremely close to unity over the mid-band region, i.e., from about 130 megacycles to about 150 megacycles. In other words, at frequencies in the mid-band region $Z_{\pi g}\cong R_g$ and $Z_{\pi p}\cong R_p$. This confirms the propriety of the preceding definitions 10 and 12, wherein $R_g$ is defined as being equal to $Z_{\pi g}$ at $\omega_{0g}$ and $R_p$ is defined as being equal to $Z_{\pi p}$ at $\omega_{0p}$. To further facilitate the examination of the factors in Equation 10 it is useful to critically examine $\beta$, the image phase constant for a three-element shunt I full section. As given at page 173 of the "Reference Data . . ." handbook:

$$\beta=\cos^{-1}\left[1-2\frac{\omega^2-\omega_1^2}{\omega_2^2-\omega_1^2}\right] \qquad (12)$$

Figure 6:
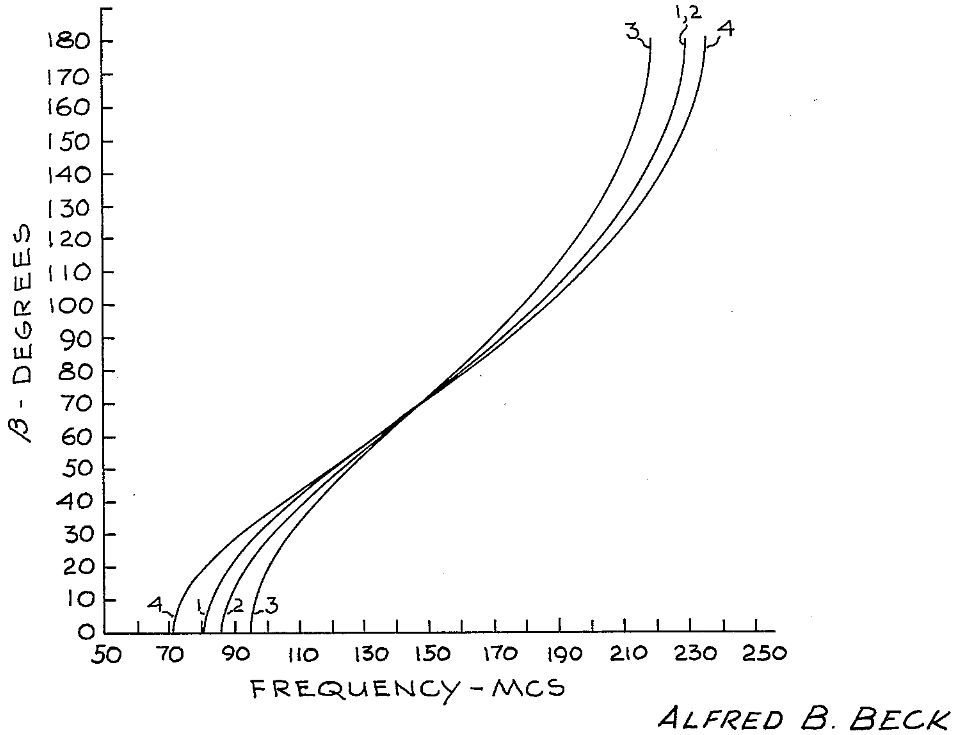

Equation 12 has been graphed in FIG. 6 for various values of $\omega_1$ and $\omega_2$. It is important to note that the three curves in FIG. 6 intersect in the region between 130 and 160 megacycles, and that the magnitude of the difference between any pair of curves is close to zero in this region. Now let it be assumed that one of the curves in FIG. 6 is the image phase constant of a plate line section and that another one of the curves is the image phase constant of the corresponding grid line section. With that assumption, the difference between $\theta$ and $\phi$ (i.e., $\psi$, the differential phase constant) is seen to be inherently very small at frequencies near $\omega_{0d}$.

Having recognized above that $Z_{\pi p}\cong R_g$, $Z_{\pi p}\cong R_p$, and $\psi\cong 0$ at frequencies in the mid-band region, it is now possible to develop an expression for the power gain normalized to its value at $\omega_{0d}$. It is proper from the above to assume that $\omega_{0g}\cong\omega_{0p}\cong\omega_{0d}$, and $\psi(\omega_{0d})\cong 0$. With those assumptions, the power gain at $\omega_{0d}$ becomes:

$$G_p(\omega_{0d})\simeq\left(\frac{ng_m}{2}\right)^2 R_g R_p \qquad (13)$$

In Equation 13 above, the factor $n^2$ comes from the factor in brackets in Equation 10, that is, by L'Hopital's rule in the limit $\psi\rightarrow 0$, $$\left[\frac{\sin\frac{n\psi}{2}}{\sin\psi/2}\right]^2\rightarrow n^2$$

Further, the factors $Z_{\pi g}$ and $Z_{\pi 1}$ in Equation 10 becomes $R_g$ and $R_p$ in Equation 13 because it has been determined above that $Z_{\pi g}=R_g$ and $Z_{\pi p}=R_p$ at mid-band frequencies.

The normalized power gain is now obtainable by taking the ratio of the power gain, as stated by Equation 10, to the power gain at $\omega_{0d}$, as stated by Equation 13. Thus, the normalized power gain is given by:

$$G_{pn}=\left(\frac{G_p(\omega)}{G_p(\omega_{0d})}\right)\simeq\left(\frac{Z_{\pi g}}{R_g}\right)\left(\frac{Z_{\pi p}}{R_p}\right)\left[\frac{\sin n\psi/2}{n\sin\psi/2}\right]^2 \qquad (14)$$

Equation 14 may be better appreciated by restating it in decibel form, that is:

$$G_{pn}(\text{db})=G_p(\omega)\ [\text{db}]-G_p(\omega_{0d})\ \text{in db}$$

And a further alternative form of Equation 14 is useful:

$$G_{pn}(\text{db})=G'_{pn}(\text{db})+\delta(\psi, n)\text{db} \qquad (15)$$

wherein $$G'_{pn}(\text{db})=10\log_{10}\left(\frac{Z_{\pi g}Z_{\pi p}}{R_g R_p}\right) \qquad (16)$$

$$\delta(\psi, n)=20\log_{10}\left[\frac{\sin n\psi/2}{n\sin\psi/2}\right] \qquad (17)$$

It is now possible to compare the frequency response characteristic of a distributed amplifier having dissimilar or staggered grid and plate line passbands with the frequency response of a conventional distributed amplifier having identical grid and plate lines. Such comparison enables one to see the effects which any selected degree of staggering will have on the frequency response characteristics of an amplifier having staggered grid and plate lines. By definition, a distributed amplifier having identical or very closely similar grid and plate lines possesses the following properties:

$$\omega_{1g}=\omega_{1p},\ \omega_{2g}=\omega_{2p},\ \omega_{0g}=\omega_{0p}\cong\omega_{0d}$$

Therefore, from Equation 10, the power gain of a conventional distributed amplifier having identical grid and plate lines is:

$$G_{pc}=\left(\frac{ng_m}{2}\right)^2\left(\frac{Z_\pi}{R}\right)^2 R_g R_p \qquad (18)$$

And, since $\psi=0$ for such an amplifier, the normalized power gain is given by Equation 14 as being:

$$G_{pnc}=\left(\frac{Z_\pi}{R}\right)^2 \qquad (19)$$

An alternative expression of Equation 19 in decibel form is useful:

$$G_{pnc}(\text{db})=20\log_{10}\left(\frac{Z_\pi}{R}\right) \qquad (20)$$

Figure 8:
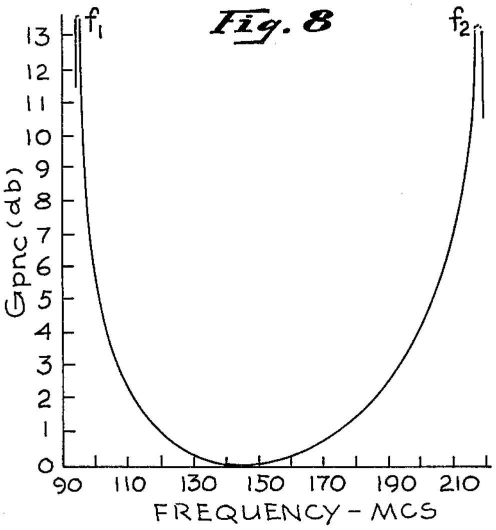
Figure 9:
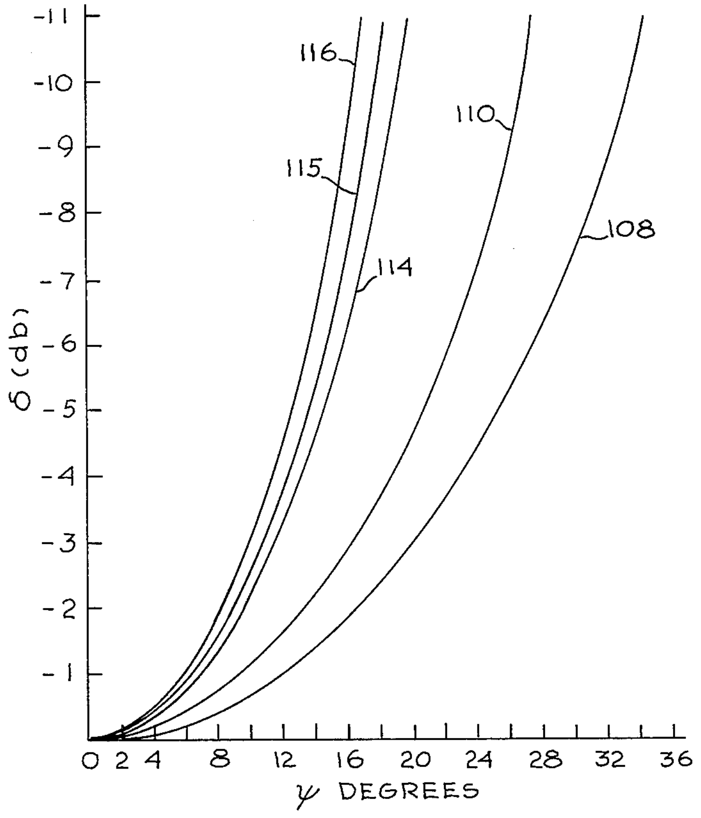

The normalized power gain for a distributed amplifier having identical phase characteristics in the grid and plate lines, as defined by Equation 20 is graphed in FIG. 8. That is, FIG. 8 is a rigorous graphical representation of Equation 20. It may be observed from FIG. 8 that a basic bandpass distributed amplifier having identical grid and plate line characteristics will exhibit an extreme rise in gain at frequencies near each band edge. For example, from FIG. 8 it may be seen that a 97 mc. signal is amplified by 10 db more than a 140 mc. signal. Similarly, a 140 mc. signal is down 10 db or more in comparison with a 216 mc. signal. Moreover, it is to be noted that the normalized power gain of a conventional distributed amplifier, as shown by FIG. 8, is not a function of the number of tubes. In theory, and neglecting system losses, a bandpass distributed amplifier having identical grid and plate lines will exhibit excessive gain near the band edges regardless of whether only a few tubes or an extremely large number of tubes are built into the amplifier. The foregoing inherent characteristics are extremely undesirable. One primary feature of the present invention stems from recognition of the foregoing undesirable attributes of basic distributed amplifier structures. To overcome the foregoing, the present invention features the use of an input or grid transmission line in which each section has a phase shift characteristic dissimilar to that of the corresponding section of the output or plate transmission line. More exactly, the dissimilarity resides in the grid transmission line having a network phase characteristic which is substantially different from the network phase characteristic of the plate transmission line; i.e., $\theta(\omega_1\neq\phi(\omega_1)$, and $\theta(\omega_2)\neq\phi(\omega_2)$. Stated differently, the amplifier of the present invention has grid and plate line network sections which exhibit a phase shift differential $\psi$ which is a function of frequency over the desired passband range and which is different from 0 over most of that range. More specifically, the frequency dependent magnitude of $\psi$ is selected and controlled in accordance with discrete criteria which will appear from the following.

Critical inspection of Equations 14, 15, and 16 helps to visualize the improvements which may be achieved by the use of dissimilar grid and plate lines. For a basic distributed amplifier having substantially identical grid and plate lines (i.e., $\omega_{1g}=\omega_{1p}$, and $\omega_{2g}=\omega_{2p}$), Equation 16 is approximately equal to Equation 20. Accordingly, it is proper to consider that Equation 15 represents, approximately, the gain of a conventional or basic distributed amplifier plus a gain correction term as given by Equation 17. In other words, Equation 17 is the correction factor which may be used to improve the shape of the gain characteristic of FIG. 8. For an amplifier having a predetermined number of tubes, the only variable in Equation 17 is $\psi$, the differential phase shift characteristic. Accordingly, by controlling the manner in which $\psi$ varies as a function of frequency, it is possible to very substantially reshape the normalized power gain characteristic of FIG. 8.

As noted heretofore with reference to FIG. 8, a conventional distributed amplifier has excessive gain at band edge frequencies as compared with the mid-band gain. Amplifiers previously built have exhibited that characteristic in the form of band edge instability (occasional and unpredictable oscillation at band edge frequencies) and in the form of inadequate gain at center-of-the-band frequencies.

In accordance with the present invention, those faults have been overcome by utilizing grid and plate transmission line structures which are so related that $\psi$ is small in the center of the band region and is relatively large at frequencies near the edges of the desired passband. By so controlling the frequencies dependent variable $\psi$, the gain correction factor $\delta$ is controlled in a manner to substantially eliminate the undesirable edge of band peaks from the gain characteristic of FIG. 8.

To the foregoing ends, it is useful to consider the manner in which the correction factor $\delta$ varies as a function of $\psi$ for amplifiers having various numbers of distributed tubes. Thus, Equation 17 is graphed in FIG. 9 for a number of different values of $n$; that is, in FIG. 9 curves 116, 115, 114, 110, and 108 represent the values of $\delta$(db) for amplifiers having 16, 15, 14, 10, and 8 tubes respectively. It is important to note that, even for small values of $\psi$, $\delta(\psi, n)$ can be a powerful factor in correcting the shape of the power gain characteristic. That is especially true for amplifiers having a large number of tubes.

In distributed amplifiers generally, the plate line reverse termination is obliged to dissipate very substantial amounts of power. In high power distributed amplifiers, such as are required for wideband high frequency radio transmitters, the reverse termination network preferably should be fluid-cooled and must dissipate power levels of the order of kilowatts. Thus, the reverse termination network in a high power distributed amplifier is physically large and expensive. Further, the power dissipated in the reverse termination network represents a very important sacrifice in over-all efficiency of the apparatus. Accordingly, it is desirable to consider ways and means of minimizing the plate line reverse termination power so that better efficiency may be realized and economical structures may be used for the reverse termination network 53. Accordingly, before proceeding further with the analysis and specification of $\delta(\psi, n)$ as a function of frequency, it is desirable to rigorously consider the reverse termination power or power fed to the network 53 and to evaluate how it may affect the selection of optimum values of $\psi$ and $n$.

Considering FIG. 5, it can be shown that the complex voltage gain from the grid line input port (terminals 117 and 118) to the reverse termination port 53 is given by the following expressions:

$$\frac{e_r}{e_1}=A+A\epsilon^{-(\gamma_g+\gamma_p)}+A\epsilon^{-2(\gamma_g+\gamma_p)}+\cdots A\epsilon^{-(n-1)(\gamma_g+\gamma_p)} \qquad (21)$$

$$\frac{e_r}{e_1}=A\sum_{k=1}^{n}\epsilon^{-(k-1)(\gamma_g+\gamma_p)}=A\left[\frac{1-\epsilon^{-n(\gamma_g+\gamma_p)}}{1-\epsilon^{-(\gamma_g+\gamma_p)}}\right] \qquad (22)$$

$$\frac{e_r}{e_1}=A\epsilon^{\frac{-(n-1)(\gamma_g+\gamma_p)}{2}}\left[\frac{\sinh\frac{n(\gamma_g+\gamma_p)}{2}}{\sinh\frac{(\gamma_g+\gamma_p)}{2}}\right] \qquad (23)$$

We may again observe that within the grid line and plate line passbands, respectively $\alpha_g\cong0$ and $\alpha_p\cong0$. Accordingly, the reverse voltage gain as defined by Equation 23 reduces to the following expression:

$$\left|\frac{e_r}{e_1}\right|=|A|\left|\frac{\sin n\frac{(\phi+\theta)}{2}}{\sin\frac{(\phi+\theta)}{2}}\right| \qquad (24)$$

The reverse termination power is.

$$P_r=\frac{e_1^2A^2}{Z_{\pi p}}\left[\frac{\sin n\left(\frac{\phi+\theta}{2}\right)}{\sin\left(\frac{\phi+\theta}{2}\right)}\right]=\frac{e_1^2g_m^2Z_{\pi p}}{4}\left[\frac{\sin n\left(\frac{\phi+\theta}{2}\right)}{\sin\left(\frac{\phi+\theta}{2}\right)}\right] \qquad (25)$$

The reverse power gain is, finally, given by the following expression:

$$G_{pr}=\frac{P_r}{P_1}=\left(\frac{g_m}{2}\right)^2\frac{Z_{\pi g}}{Z_{\pi p}}\left[\frac{\sin n\left(\frac{\phi+\theta}{2}\right)}{\sin\left(\frac{\phi+\theta}{2}\right)}\right]^2 \qquad (26)$$

From classical theory as set forth in the "Reference Data . . ." handbook, it may be observed that for constant-$k$ filter sections, $\phi=\theta$ at $\omega_0$. That being the case, Equation 26 immediately indicates that $G_{pr}(\omega_0)$ would be equal to $G_p(\omega_0)$ if constant-$k$ network sections were used. In other words, an amplifier using constant-$k$ sections would have at the mid-band frequency the same power gain in the reverse direction as in the forward direction, the reverse termination network would have to dissipate power equal to the useful power output, and the efficiency of the distributed amplifier would be relatively very poor. The foregoing indicates that constant-$k$ sections should not be used in the transmission lines of distributed amplifiers which are to be used for high power output. Rather, it is most advantageous to use three-element shunt I networks for which it can be shown that $G_{pr}\cong0$ at $\omega_0$.

It is now possible to intelligently specify the values of $\omega_{1g}$, $\omega_{2g}$, $\omega_{1p}$, and $\omega_{2p}$ which should be used to achieve the original desiderata of a high power bandpass distributed amplifier. One of the original objects stated heretofore is that the power gain versus frequency is to be relatively constant across the amplifier passband. Another previously stated object is that excessive power amplification at band edge frequencies and the consequent instability are to be avoided. Those objects, together with reduction of reverse termination power, can be fairly well attained by specifying that $G_{pn}$ and $G_{pr}$ shall be zero at the band edge frequencies $\omega_{1p}$ and $\omega_{2p}$ define the upper and lower limits of the plate line passband. That is, if the normalized power gain and the reverse power gain are zero at $\omega_{1p}$ and also at $\omega_{2p}$, and if the desired composite passband is at least very slightly narrower than the plate line passband, it is clear that the power gain at each band edge will be very substantially reduced so that oscillation or instability at the band edges is avoided. $\omega_{1p}$ and $\omega_{2p}$ cannot be directly calculated, but must be first selected arbitrarily, after which $\omega_{1g}$, $\omega_{2g}$, $\omega_{1d}$, and $\omega_{2d}$ can be calculated from the following expressions.

First, it has been established above that $G_p$ and $G_{pr}$ should be equal to zero at the band edges, that is, at $\omega_{1p}$ and $\omega_{2p}$. To achieve that, the factor in brackets in Equation 10 and the factor in brackets in Equation 26 must both go to zero when $\omega=\omega_{1p}$. It can be readily shown that for $$\left[\frac{\sin n\frac{\psi}{n}}{n\sin\frac{\psi}{2}}\right]$$

to be equal to 0 at the frequency $\omega_{1p}$, the absolute value of $\psi$ must be equal to $2\pi/n$. Therefore, to satisfy the lower band edge zero power requirement, the following must hold:

$$\phi=\frac{2\pi}{n}\text{ at }\omega=\omega_{1p},(n>2) \qquad (27)$$

Referring to FIG. 6, attention is directed to the fact that $\beta$ for the three-element shunt I network goes to a value of $\pi$ at $\omega_2$ and remains at the value $\pi$ for frequencies above $\omega_2$. That is, the phase characteristic $\beta$ is discontinuous at the point $\omega_2$. Accordingly, at the frequency $\omega=\omega_{2p}$, $\theta=\pi$, and therefore $\psi=\phi-\pi$. Knowing that the factor in brackets in Equation 10 desirably should go to zero at $\omega_{2p}$, and having the above value $\psi=\phi-\pi$, it is readily shown that:

$$\phi=\frac{(n-2)\pi}{n} \qquad (28)$$

when $\omega > \omega_{2p}$. Thus we have established the following: at $\omega_{1p}$, $\theta=0$, and $\phi=2\pi/n$; at $\omega_{2p}$, $\theta=\pi$, and $$\phi=\frac{n-2}{n}\pi$$

The foregoing values rigidly define the preferred dissimilar phase shift characteristics of the plate and grid transmission lines. Likewise, with $\phi$ and $\theta$ being so defined, the differential phase shift $\psi$ is also defined for all values of $\omega$.

Given the above values of $\phi$ and $\theta$, $\omega_{1p}$ is readily derived from the following expression:

$$\omega_{1g}=\left[\frac{\omega_{1p}^2+(\omega_{1p}^2+\omega_{2p}^2)\cos\left(\frac{2\pi}{n}\right)-\omega_{2p}^2}{2\cos\frac{2\pi}{n}}\right]^{1/2} \quad (29)$$

and $\omega_{2g}$ is given by:

$$\omega_{2g}=[\omega_{1p}^2+\omega_{2p}^2-\omega_{1g}^2]^{1/2} \quad (30)$$

It should be noted that $\omega_{1g}<\omega_{1p}<\omega_{1d}$ and $\omega_{2g}>\omega_{2p}>\omega_{2d}$. The band edge frequencies have been specified so that the plate line impedance level will be maximized, thereby insuring maximum amplifier efficiency. In addition, the band edge values of $\phi$ and $\theta$ have been chosen so that $G_p$ and $G_{pr}$ are 0 at the band edge frequencies. This insures against excessive power gain near the band edges and therefore eliminates the possibility of band edge instability or oscillation.

Figure 10:
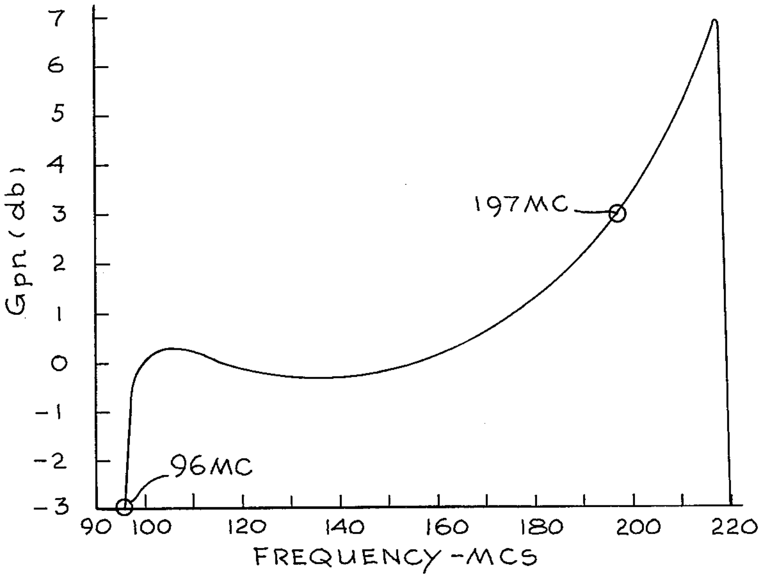
Figure 11:
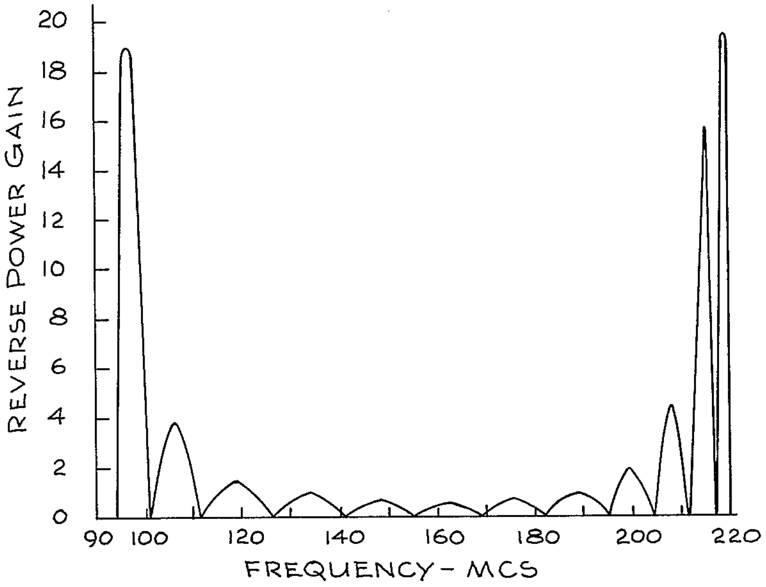

Having determined $\omega_{1g}$, $\omega_{2g}$, $\omega_{1p}$, and $\omega_{2p}$ in accordance with the above, the normalized power gain is readily computed by means of Equation 14. The computed normalized power gain for an embodiment of the present invention having the above band edge frequencies is graphed in FIG. 10. Similarly, the reverse power gain is readily calculable by means of Equation 26. The calculated reverse power gain is graphed in FIG. 11 for one particular embodiment of a distributed amplifier in accordance with the present invention, wherein $f_{1g}=82.85$ mc., $f_{2g}=224.85$ mc., $f_{1p}=95$ mc. and $f_{2p}=220$ mc. FIG. 10 indicates that there is a substantial peak of about 7 db at the high band edge in the normalized power gain as calculated. However, FIG. 10 is the result of calculations assuming no losses in the system. In actual practice, as the frequency increases from about 140 mc. to 220 mc., grid conductance loading and attenuation become increasingly more important so that the peak at the high band edge, as shown in FIG. 10, is very substantially reduced.

While applicant does not wish to be limited to any specific values of circuit constants, the following are given by way of example as being electrical component values which have proved to be useful in one amplifier having the foregoing operational characteristics and using the circuit of FIG. 1:

| | |
|---|---|
| Tubes **21**, **21***a*, etc. | 4W 300B |
| Inductors **31***a*, **31***b*, etc. | 0.0533 μhy. |
| Inductors **33**, **33***b*, etc. | 0.3384 μhy. |
| Inductors **37***a*, **37***b*, etc. | 0.6380 μhy. |
| Inductors **39***a*, **39***b*, etc. | 0.2924 μhy. |
| Inductor **51** | 0.0549 μhy. |
| Inductor **61** | 0.1488 μhy. |
| Inductor **13** | 0.0684 μhy. |
| Inductor **17** | 0.0635 μhy. |
| Capacitors **35***a*, **35***b*, etc. | 0.001 μfd. |
| Capacitors **47***a*, **47***b*, etc. | 0.0014 μfd. |
| Capacitors **41***a*, **41***b*, etc. | 0.001 μfd. |
| Capacitor **55** | 11.93 pfd. |
| Capacitor **59** | 17.58 pfd. |
| Capacitor **63** | 15.17 pfd. |
| Resistors **43***a*, **43***b*, etc. | 270Ω, ½ watt. |
| Resistor **57** | 50.0Ω, 500 watt liquid cooled. |
| Resistor **97** | 50.0Ω |
| Inductor **69** | 0.0549 μhy. |
| Inductor **79** | 0.1488 μhy. |
| Inductor **65** | 0.1924 μhy. |
| Inductor **95** | 0.1748 μhy. |
| Inductor **87** | 0.0684 μhy. |
| Capacitor **71** | 11.93 pfd. |
| Capacitor **75** | 9.0 pfd. |
| Capacitor **77** | 9.0 pfd. |
| Capacitor **81** | 8.0 pfd. |
| Capacitor **83** | 7.0 pfd. |
| Capacitor **91** | 0.001 μfd. |
| Capacitor **93** | 15.47 pfd. |
| Capacitor **94** | 20.06 pfd. |
| Capacitor **96** | 12.652 pfd. |
| Inductor **89** | 0.0635 μhy. |
| Inductor **31** | 0.0277 μhy. |
| Inductor **33***n* | 0.0277 μhy. |
| 4W 300B | $C_g$=21.74 pfd.<br>$C_p$=8.8 pfd. |

In addition to the advantages previously stated, apparatus constructed in accordance with the concepts of the present invention is advantageous in another respect. FIG. 7 shows that the mid-shunt image impedance $Z_{\pi g}$ of the grid transmission line increases very rapidly at each band edge, that is, at $\omega_{1g}$ and near $\omega_{2g}$. It can be shown that for a constant input power level applied to terminals 9 and 11 of FIG. 1, the voltage at each and every grid will rise in accordance with the rise of $Z_{\pi g}$ at each grid line band edge. An amplifier utilizing the concepts of the present invention necessarily has a grid line passband broader than the amplifier passband. That is, $\phi$ goes to 0 at a lower frequency than $\theta$, and $\phi$ goes to its limit value $\pi$ at a frequency higher than $\theta$. Accordingly, the grid voltage peaking near each edge of the grid line band is outside the edge of the composite bandpass of the amplifier, and grid voltage peaking near either band edge is substantially reduced in comparison with the grid voltage peaking which would occur in a distributed amplifier having identical grid line and plate line phase characteristics.

In all of the foregoing analyses, it has been assumed that the tubes have a negligible grid in-lead inductance. In actual practice, applicant has found that commercially available vacuum tubes have an unavoidable grid in-lead inductance which becomes troublesome at frequencies near the high edge of the amplifier bandpass. In FIG. 12 there is shown a five-element $\pi$ network which includes the grid in-lead inductance as a network element and by means of which an iterative network for the grid transmission line can be calculated which substantially overcomes the adverse effects of grid inductance.

In addition, while the circuit analysis set forth in all the above is entirely adequate for distributed amplifiers in which the tube anodes are shielded, or in which the tubes are widely spaced, in the construction of practical amplifiers, particularly when using fluid-cooled power tubes, there is always a very substantial capacitance between the anodes of physically adjacent power tubes. FIG. 13 shows a plate line iterative network which includes the inter-tube anode-to-anode distributed capacitance as a network element.

The modified forms of iterative networks represented in FIGS. 12 and 13 are generally similar to the grid line and plate line equivalent networks represented in FIGS. 2, 3 and 4. The networks of FIGS. 2, 3, and 4 are special cases of the more general networks of FIGS. 12 and 13. Although the networks of FIGS. 12 and 13 respond to the foregoing analysis in substantially the same manner as the networks of FIG. 1, the resulting power gain expressions must be generalized. The circuit of FIG. 12 has removed the grid from the grid line nodal points by the inclusion of $L_g$, an inductance in series with the grid. The grid voltage is therefore related to the corresponding grid line nodal voltage in the following manner:

$$e_{gn}=e_n\frac{1}{1-\omega^2/\omega_g^2}$$

where:

$e_n$=grid line node voltage at $n$th node;
$e_{gn}$=grid-to-cathode voltage at $n$th tube; and
$\omega_g=1/\sqrt{L_gC_g}$.

A grid circuit transfer function, $T_g$, can be defined as:

$$T_g=e_{gn}/e_n=\frac{1}{1-\omega^2/\omega_g^2}$$

The magnitude of the grid voltage is now related to the input power to the grid line by the following expression:

$$R_g\ \text{(R.M.S.)}=T_g\sqrt{P_{in}Z_{\pi g}}$$

and $$P_{in}=e_n^2/Z_{\pi g}=\frac{(1-\omega^2/\omega_g^2)^2e_{gn}^2}{Z_{\pi g}}$$

In a manner substantially similar to the foregoing analysis, expressions can be derived for the forward and reverse power gains of an amplifier employing the circuits of FIGS. 12 and 13. The resulting expressions are:

$$G_p=\frac{P_o}{P_{in}}=T_g^2\left(\frac{g_m}{2}\right)^2Z_{\pi g}Z_{\pi p}\left[\frac{\sin n\ \psi/2}{\sin \psi/2}\right]^2$$

$$G_{pn}=\frac{G_p(\omega)}{G_p(\omega_0)}\simeq\frac{T_g^2(\omega)}{[1-(\omega_0\omega_g)^2]^2}\frac{Z_{\pi g}Z_{\pi p}}{R_gR_p}\left[\frac{\sin n\ \psi/2}{n\sin \psi/2}\right]^2$$

$$G_{pr}=\frac{P_r}{P_{in}}=I_g^2\left(\frac{g_m}{2}\right)^2Z_{\pi g}Z_{\pi p}\left[\frac{\sin n\left(\frac{\phi+\theta}{2}\right)}{\sin\left(\frac{\phi+\theta}{2}\right)}\right]^2$$

There are significant differences between the amplifier performance with circuits of FIGS. 2, 3, and 4 and its performance with circuits of FIGS. 12 and 13. First, the grid voltage is boosted by the factor $T_g$ as $\omega$ grows larger. In addition, the grid voltage is peaked by the rise in $Z_{\pi g}$ as $\omega$ nears either band edge. It is desirable to maintain the grid voltage at a constant value, $k_1$, to maximize amplifier efficiency. Therefore:

$$e_g\ \text{(R.M.S.)}=k_1=T_g\sqrt{P_{in}Z_{\pi g}}$$

This equation may be solved for $P_{in}$:

$$P_{in}(\omega)=\frac{k_1^2}{T_g^2(\omega)Z_{\pi g}(\omega)}$$

The requirements that must be imposed on $\delta(\psi, n)$ are slightly modified since, for constant output power, the following condition must be met:

$$P_{in}(\omega)G_p(\omega)=\text{constant } P_o$$

The requirement for input power equalization is offset by the greater control over $\psi$ offered by the more general grid and plate circuits of FIGS. 12 and 13. $\phi$ and $\theta$ for the networks of FIGS. 12 and 13 are defined by the following expressions:

$$\phi=\beta_g=\cos^{-1}\left\{1-2\ \frac{(1-\omega_{2g}^2/\omega_g^2)(1-\omega^2/\omega_{1g}^2)}{(1-\omega_{2g}^2/\omega_{1g}^2)(1-\omega^2/\omega_g^2)}\right\}$$

$$\theta=\beta_p=\cos^{-1}\left\{1-\frac{2}{1+\frac{\omega_{2p}^2-\omega^2}{m_1^2(\omega^2-\omega_1^2)}}\right\}$$

where $$m_1=\sqrt{\frac{1-\omega_{2p}^2/\omega_p^2}{1-\omega_{1p}^2/\omega_p^2}}=\sqrt{\frac{1}{1+4C_{pp}/L_0}}$$

$$\omega_p=\frac{1}{\sqrt{L_1C_{pp}}}$$

In addition, the expressions for $Z_{\pi g}$ and $Z_{\pi p}$ are modified and become the following:

$$Z_{\pi p}=\frac{\omega\Delta\omega_p}{\sqrt{(\omega_{2p}^2-\omega^2)(\omega^2-\omega_{1p}^2)}}\left\{\frac{\Delta\omega_pC_0}{2}\left[1+\frac{4C_{pp}}{C_0}\right]^{1/2}\right\}^{-1}$$

$$Z_{\pi g}=2L_2\omega\left\{\frac{1-\omega^2/\omega_g^2}{(1-\omega^2/\omega_{1g}^2)\sqrt{-1\pm\frac{(1-\omega_{2g}^2/\omega_{1g}^2)(1-\omega^2/\omega_g^2)}{(1-\omega_{2g}^2/\omega_g^2)(1-\omega^2/\omega_{1g}^2)}}}\right\}$$

where: the sign under the radical in the expression for $Z_{\pi g}$ is chosen to make $Z_{\pi g}$ real for $\omega_{1g}<\omega<\omega_{2g}$.

$$L_2=\frac{1}{\omega_1^2C_g}-L_g$$

In general, it is found that optimum mid-band minimization of $\psi$ may be approximated by forcing $\omega_g$ to equal $\omega_p$. $\psi$ may still be controlled at the band edges by proper adjustment of $\omega_{1g}$ and $\omega_{2g}$.

To summarize, the use of the more general grid and plate line circuits of FIGS. 12 and 13 introduces more degrees of freedom into the final selection of circuit parameters, thereby allowing a better optimization of equipment performance to be realized. In addition, the networks allow otherwise deleterious stray circuit reactances to be absorbed in accordance with a definite analytical procedure.

While applicant does not intend to limit the invention to any specific circuit constants, the following values are given as illustrative of one embodiment of the invention using the general circuit arrangement of FIG. 1, but with the specific grid and plate transmission line iterative sections illustrated by FIGS. 12 and 13:

| | | |
|---|---|---|
| Capacitor **134** | pfd | 9.61 |
| Inductor **130** | μhy | 0.0652 |
| Inductor **132** | μhy | 0.0228 |
| Inductor **136** | μhy | 0.3598 |
| Inductor **138** | μhy | 0.0228 |
| Inductor **140** | μhy | 0.3598 |
| Capacitor **144** | pfd | 5.25 |
| Capacitor **147** | pfd | 1.5 |
| Capacitor **149** | pfd | 5.25 |
| Capacitor **145** | μhy | 0.533 |
| Capacitor **146** | μhy | 0.144 |
| Capacitor **148** | μhy | 0.533 |

In the embodiment of the present invention using the networks shown by FIGS. 12 and 13 and the network element values tabulated above, the following edge of band frequencies have been used successfully:

$f_{1g}$=83 mc.
$f_{2g}$=225 mc.
$f_{1p}$=95 mc.
$f_{2p}$=220 mc.

With the transmission line sections arranged to have the foregoing limit frequencies, the differential phase constant $\psi$ was less than 2° in the mid-band region (140–170 mc.) and substantially exceeded 20° at the band edge frequencies of 95 mc. and 220 mc.

By again considering Equations 10 to 20, it can be fully appreciated that the foregoing values of $\psi$ provide the desired reduction in power gain at frequencies near the edges of the composite passband.

While there have been described what are at present considered to be preferred embodiments of the invention, it will be obvious to those skilled in the art that various changes and modifications may be made therein without departing from the invention, and it is aimed in the appended clams to cover all such changes and modifications as fall within the true spirit and scope of the invention.

The embodiments of the invention in which an exclusive property or privilege is claimed are defined as follows:

1. In a high power distributed amplifier:
first and second signal transmission lines;
means for applying input signals to one end of said first line;
means for deriving amplified signals from one end of said second line;
means terminating the other ends of said lines; and at least three amplifier devices each comprising an input terminal and an output terminal, with said input terminals individually coupled to electrically spaced points along said first line and said output terminals individually coupled to electrically spaced points along said second line;

said first and second lines having incremental signal phase shift characteristics $\phi$ and $\theta$ respectively, with $\phi$ and $\theta$ being different functions of signal frequency such that $\phi$ and $\theta$ are approximately equal at frequencies near the middle of the composite bandpass characteristic and are significantly unequal at frequencies near the edges of the amplifier bandpass.

2. In a high power distributed amplifier:

first and second signal transmission lines;

means for applying input signals to one end of said first line;

means for deriving amplified signals from one end of said second line;

means terminating the other ends of said lines; and at least three amplifier devices each comprising an input terminal and an output terminal, with said input terminals individually coupled to electrically spaced points along said first line and said output terminals individually coupled to electrically spaced points along said second line;

said first and second lines having incremental signal phase shift characteristics $\phi$ and $\theta$ respectively, with $\phi$ and $\theta$ being different functions of signal frequency, and with said functions being characterized in that $\phi$ is larger than $\theta$ at signal frequencies near the lower end of the desired composite bandpass and smaller than $\theta$ at frequencies near the upper end.

3. In a high power distributed amplifier:

first and second signal transmission lines;

means for applying input signals to one end of said first line;

means for deriving amplified signals from one end of said second line;

means terminating the other ends of said lines; and at least three amplifier devices each comprising an input terminal and an output terminal, with said input terminals individually coupled to electrically spaced points along said first line and said output terminals individually coupled to electrically spaced points along said second line;

said first and second lines having incremental signal phase shift characteristics $\phi$ and $\theta$ respectively, with $\phi$ and $\theta$ being different functions of signal frequency;

said functions being characterized in that $\phi$ is appreciably greater than $\theta$ at signal frequencies of the order of 100 megacycles and appreciably smaller than $\theta$ at frequencies of the order of 200 megacycles.

4. A filter amplifier comprising:

an input transmission line;

an output transmission line;

at least three partial amplifiers, each partial amplifier comprising an input electrode connected to a point on said input line and an output electrode connected to a point on said output line;

input terminals for applying signals to be amplifier to one end of said input line;

means terminating the other end of said input line;

output terminals for deriving amplifier signals from one end of said output line; and means terminating the other end of said output line;

said output line having an incremental signal phase shift $\theta$ between the points of connection of successive amplifier output electrodes;

said input line having an incremental signal phase shift $\phi$ between the points of connection of successive amplifier input electrodes, with $\phi$ and $\theta$ being different positive functions of signal frequency such that the phase difference between the signal voltages at corresponding points on said input and output lines varies as a function of signal frequency and increases as the signal frequency approaches the edges of the desired bandpass.

5. A filter amplifier comprising:

an input transmission line;

an output transmission line;

at least three partial amplifiers, each partial amplifier comprising an input electrode connected to a point on said input line and an output electrode connected to a point on said output line;

input terminals for applying signals to be amplified to one end of said input line;

means terminating the other end of said input line;

output terminals for deriving amplified signals from one end of said output line; and means terminating the other end of said output line;

the signal phase shift between a pair of successive amplifiers in said input line and said output line being substantially equal at a first frequency and appreciably different at a second frequency so that said pair of amplifiers has a relatively lower composite power gain at said second frequency.

6. In a high power distributed amplifier:

first and second signal transmission lines;

means for applying input signals to one end of said first line;

means for deriving amplified signals from one end of said second line;

means terminating the other ends of said lines;

said first line comprising a plurality of $(n-1)$ successive line sections with each section having a signal propagation characteristic $\gamma_g=\alpha_g+j\phi$, wherein $\alpha_g$ is the attenuation characteristic and $\phi$ is the signal phase shift characteristic of each section;

said second line comprising a plurality of $(n-1)$ line sections with each section having a propagation characteristic $\gamma_p=\alpha_p+j\theta$, wherein $\alpha_p$ is the attenuation characteristic and $\theta$ is the signal phase shift characteristic of each section, with the phase shift characteristics $\phi$ and $\theta$ being functions of input signal frequency and with $\phi$ having a first value of $2\pi/n$ at about the frequency where $\theta$ is minimum and a second value $$\frac{(n-2)\pi}{n}$$

at about the frequency where $\theta$ reaches a maximum value; and a plurality of at least $n$ amplifier devices each having an input terminal and an output terminal, with said input terminals individually connected to successive sections of said first line and said output terminals individually connected to successive sections of said second line.

7. In a high power distributed amplifier:

first and second signal transmission lines;

means for applying input signals to one end of said first line;

means for deriving amplified signals from one end of said second line;

means terminating the other ends of said lines; and at least three amplifier devices each comprising an input terminal and an output terminal, with said input terminals individually coupled to electrically spaced points along said first line and said output terminals individually coupled to electrically spaced points along said second line;

said first and second lines having incremental signal phase shift characteristics $\phi$ and $\theta$ respectively, with $\phi$ and $\theta$ being different functions of signal frequency;

said functions being characterized in that the difference between $\phi$ and $\theta$ is not more than about 12 electrical degrees at frequencies within the central 50% of the composite bandpass and is appreciably larger near the edges of the bandpass.

8. In a high power distributed amplifier:
first and second signal transmission lines;
means for applying input signals to one end of said first line;
means for deriving amplified signals from one end of said second line;
means terminating the other ends of said lines; and
at least three amplifier devices each comprising an input terminal and an output terminal, with said input terminals individually coupled to electrically spaced points along said first line and said output terminals individually coupled to electrically spaced points along said second line;
each of said lines including a plurality of substantially similar four-terminal networks, each network of the first line characteristically having an image phase constant $\phi$ and each network of the second line having an image phase constant $\theta$, the composite bandpass characteristic of the amplifier being dependent upon the relationship of $\phi$ and $\theta$,
said networks being constructed and arranged so that $\theta$ has a minimum value at a frequency approximately corresponding to the lower edge of the desired composite bandpass and a maximum value $\pi$ approximately at the upper bandpass edge, and so that $\phi$ has a value of approximately $2\pi/n$ at the frequency where $\theta$ is minimum and a value of approximately $$\frac{(n-2)\pi}{n}$$

at the frequency where $\theta$ is maximum, wherein $n$ is the number of amplifier devices.

9. In a high power distributed amplifier:
first and second signal transmission lines;
means for applying input signals to one end of said first line;
means for deriving amplified signals from one end of said second line;
means terminating the other ends of said lines; and
at least three amplifier devices each comprising an input terminal and an output terminal, with said input terminals individually coupled to electrically spaced points along said first line and said output terminals individually coupled to electrically spaced points along said second line;
each of said lines including a plurality of substantially similar four-terminal networks, with each network of the first line characteristically having an image phase constant $\phi$ and each network of the second line having an image phase constant $\theta$,
with the composite bandpass of the amplifier dependent upon the relationship of $\phi$ and $\theta$, and with $\phi$ and $\theta$ being relatively adjusted to provide a 5% frequency displacement between the maximum values of $\phi$ and $\theta$ and about a 15% frequency displacement between the minimum values of $\phi$ and $\theta$.

References Cited by the Examiner

FOREIGN PATENTS 140,906 4/1951 Australia.

OTHER REFERENCES

Distributed Amplifier Covers, 10 to 360 mc., by Scharfman Electronics, July 1952, pp. 113 to 115.

ROY LAKE, *Primary Examiner.*

KATHLEEN CLAFFY, *Examiner.*